United States Patent [19]

Issa

[11] Patent Number: 5,764,026
[45] Date of Patent: Jun. 9, 1998

[54] SPARE CELLULAR TELEPHONE CHARGING UNIT

[76] Inventor: Darrell E. Issa, 2560 Progress St., Vista, Calif. 92083

[21] Appl. No.: 720,956

[22] Filed: Oct. 4, 1996

[51] Int. Cl.⁶ .................................................. H01M 10/46
[52] U.S. Cl. ................................................................ 320/2
[58] Field of Search .......................... 320/2, 5; 429/96, 429/97, 100; D13/103, 107

[56] References Cited

U.S. PATENT DOCUMENTS

| D. 342,935 | 1/1994 | Ogasawara | D13/119 |
|---|---|---|---|
| 5,256,955 | 10/1993 | Tomura et al. | 320/2 |
| 5,308,716 | 5/1994 | Shababy et al. | 429/97 |
| 5,314,763 | 5/1994 | Aksoy et al. | 429/97 |
| 5,534,366 | 7/1996 | Hwang et al. | 429/91 |
| 5,535,437 | 7/1996 | Karl et al. | 429/97 X |

*Primary Examiner*—Edward Tso
*Attorney, Agent, or Firm*—Sam Talpalatsky, Esq.

[57] ABSTRACT

A battery adapter for charging a spare cellular telephone battery in a vehicle charging unit, the adapter comprising a charging unit, having first power supply connections positioned for electrical coupling with corresponding second connections of a battery for use with a cellular telephone and a clip having an anchored biased pivot end and a hook end, wherein the hook end is resiliently movable about the pivot end for urging the hook end into a corresponding cavity of the cellular telephone for retainment of the cellular telephone in the charging unit and for urging the first and second power supply connections together to maintain electrical coupling thereof. The adapter is adapted to engage with the battery, for charging it while the cellular telephone is outside the charging unit and the adapter having a cavity therein positioned for receipt of the hook end of the clip for retaining it and the battery in the charging unit and to provide electrical contact between the first and second power supply connections.

22 Claims, 7 Drawing Sheets

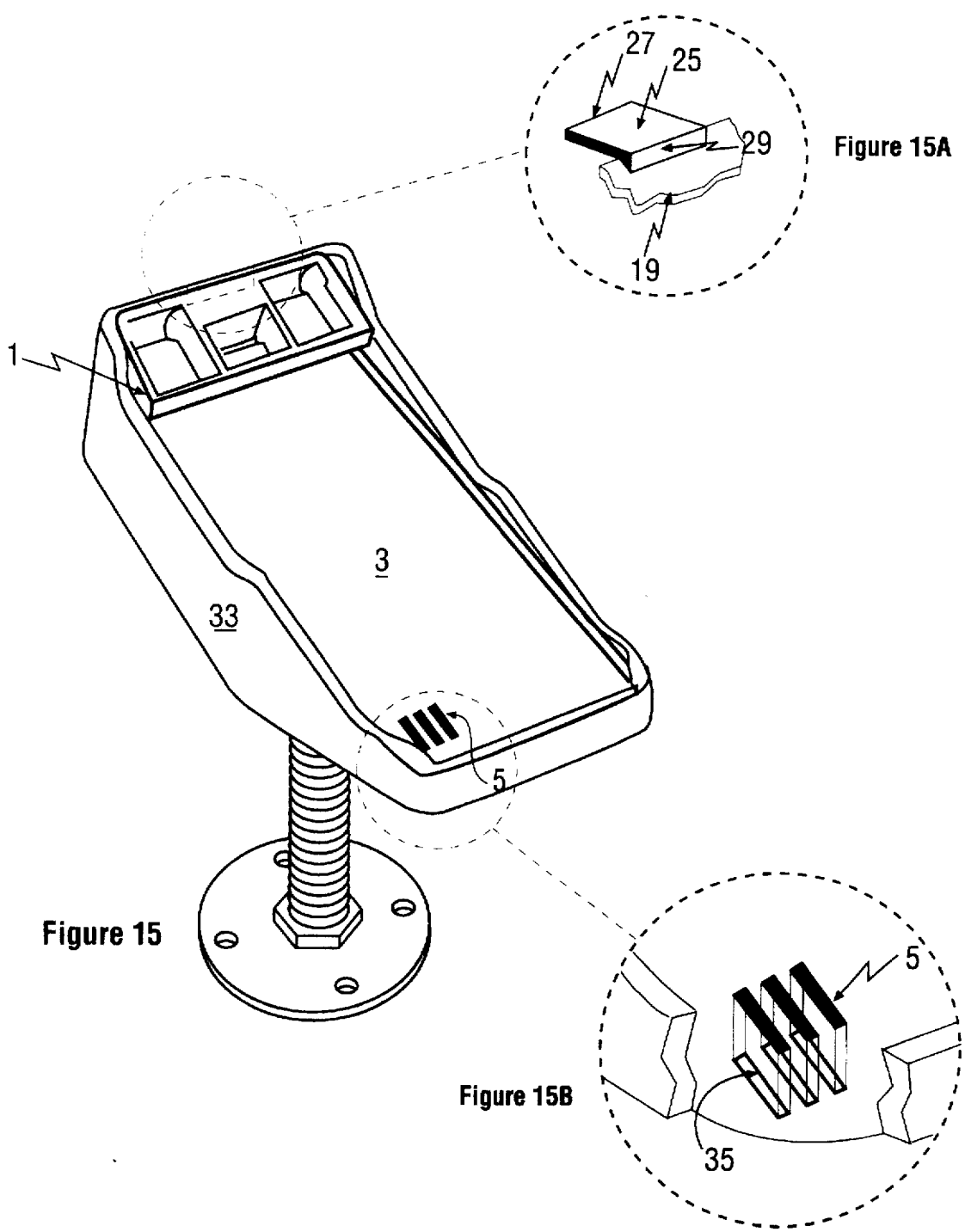

5,764,026

SPARE CELLULAR TELEPHONE CHARGING UNIT

BACKGROUND OF THE INVENTION

1. Field of the Invention

This invention pertains to the field of cell-telephone technology. More particularly, the invention discloses a novel device for utilizing an in-car cell-telephone cradle/charging-unit to charge a spare cell-telephone battery.

2. Description of the Prior Art

Wireless, cell-telephone technology has made a profound, positive impact on the civilized society. Today, this technology provides people with improved utilization of time, personal convenience and capability of reaching any other person or service without being anchored to a telephone station.

In its infancy, cell-telephones were primarily utilized in vehicles and they tapped into the power supply of their host vehicles. Quickly, however, the cell-telephone technology was adapted for portability and began to utilize battery power.

Although great technological strives are promised, battery capacity remains finite. Additionally, there is a correlation between the battery size and its power capacity. There exists a tradeoff between the desirable, low profile slim batteries and the bigger higher capacity batteries. Smaller sized batteries have a limited power capacity. A single battery is often not capable of powering a cell-telephone for the duration of its intended use. To overcome this limitation, there exist in-car cradles which retain the cell-telephone and its battery, while the two are not in use, and they also provide electrical power for recharging of the battery. However, the cradle/charging-unit is not capable, of recharging a spare battery, detached from the cell-telephone, while the cell-telephone is in use and is outside the cradle.

Another solution for recharging of the cell-telephone batteries is plugging in the cell-telephone and its battery into a cigarette lighter of the vehicle. This allows the cell-telephone to use the vehicle power supply and to recharge its battery. However, this technology requires for the battery to be connected to the vehicle power supply through the cell-telephone. Thus, a spare battery is not capable of being recharged without being connected to the cell-telephone.

Therefore, there remains a need for a device capable of utilizing an in-car cradle/charging-unit and its power supply to charge a spare battery while the cell-telephone is in use.

SUMMARY OF THE INVENTION

This invention comprises a novel device to solve the aforementioned problems. The device of the present invention is an adapter which engages a spare battery and emulates the shape and function of the host cell-telephone. The adapter and the battery thereafter are capable of being placed in the cradle/charging-unit and the battery recharges from the electrical power supplied by the vehicle to the cradle/charging-unit.

It is an object of this invention to provide an adapter emulating the physical characteristics of the cell-telephone such that the battery and the adapter can adapt to the in-car cradle/charging-unit and recharge the battery without the cell-telephone. It is a further object of this invention to allow a user to use the cell-telephone with one battery and to allow him/her to recharge a spare battery while the cell-telephone is in use. Another object of the invention is to provide a bracket emulating the shape of the cell-telephone which uses its bottom end has a stop for retaining the cell-telephone in the cradle/charging-unit. It is also an object of this invention to provide a simple, economical, dependable and cost effective way to solve the aforementioned need in the marketplace.

DESCRIPTION OF THE PREFERRED EMBODIMENT

The present invention allows the user to use his/her cell-telephone and charge a spare battery at the same time. As explained above, presently available cradle/charging-units do not allow this application. Without the present invention, one has to attach the battery to the cell-telephone and place the battery and the cell-telephone in the cradle/charging-unit for the battery to charge.

Figure 1:
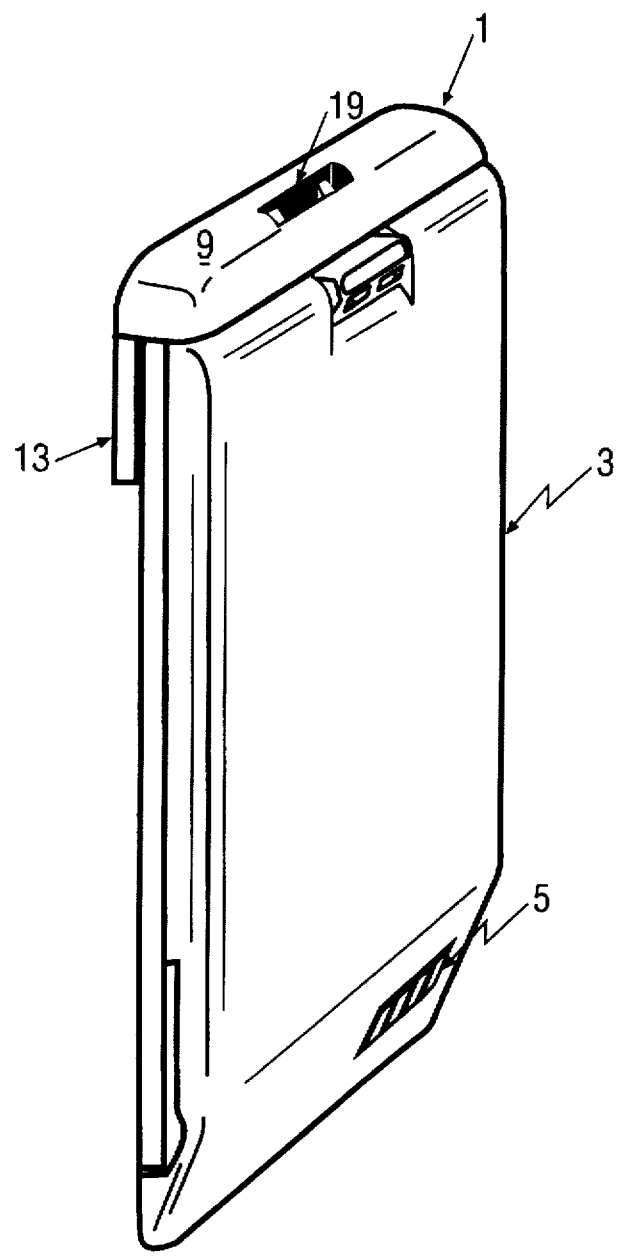
FIG. 1 is a perspective view of the preferred embodiment of the adapter connected to a cell-telephone battery.
Figure 2:
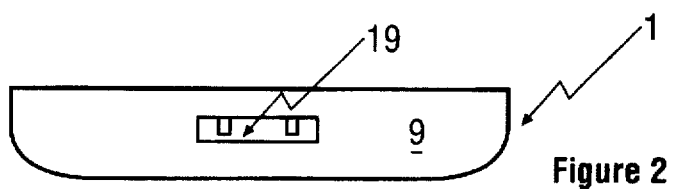
FIG. 2 is a top plan view of the preferred embodiment of the adapter.
Figure 3:
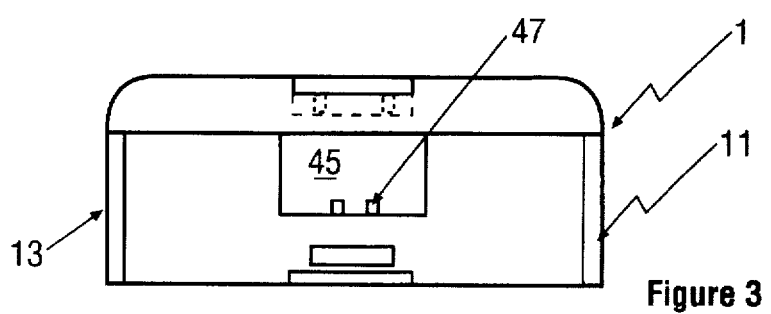
FIG. 3 is a front plan view of the preferred embodiment of the adapter.
Figure 5:
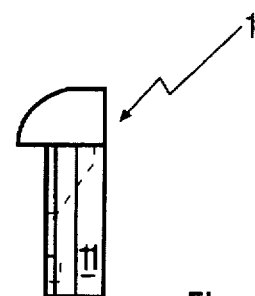
FIG. 5 is a side plan view of the preferred embodiment of the adapter.
Figure 4:
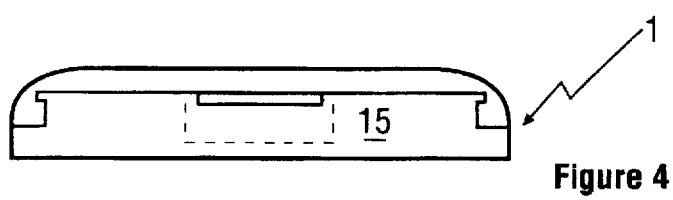
FIG. 4 is a bottom plan view of the preferred embodiment of the adapter.
Figure 6:
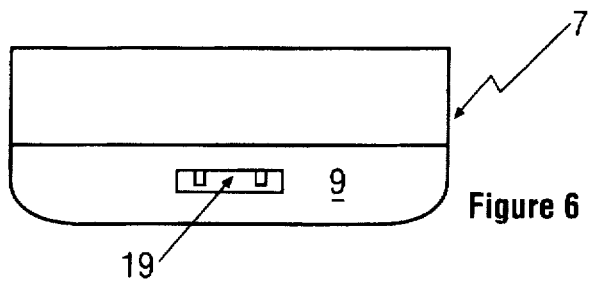
FIG. 6 is a top plan view of the elongated embodiment of the adapter.
Figure 7:
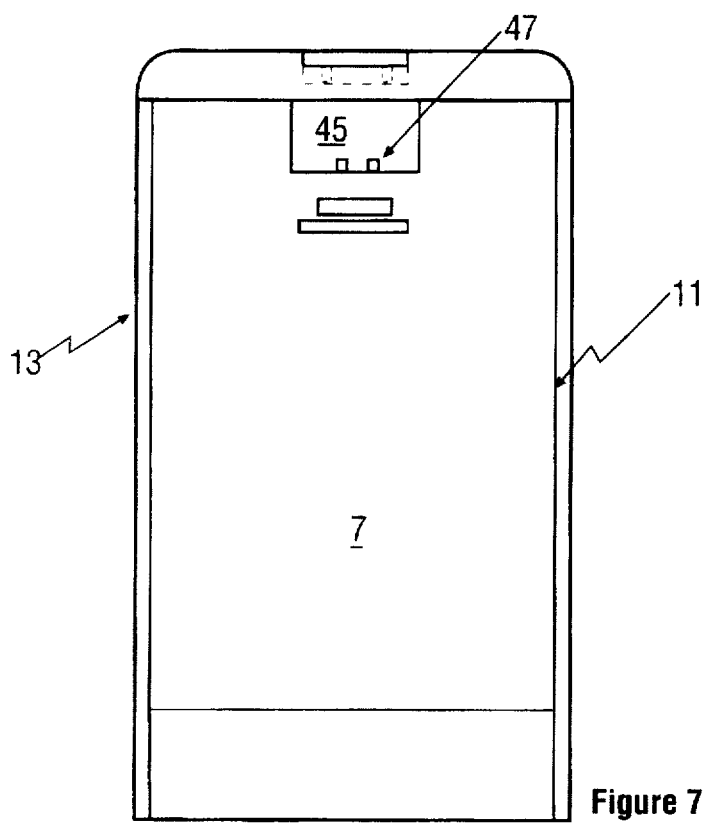
FIG. 7 is a front plan view of the elongated embodiment of the adapter.
Figure 9:
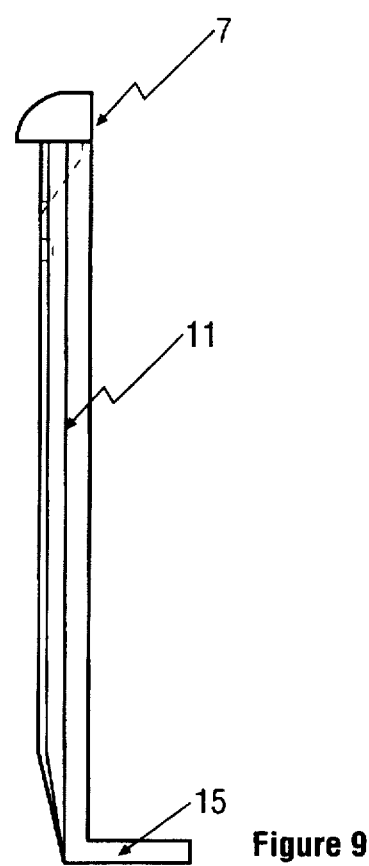
FIG. 9 is a side plan view of the elongated embodiment of the adapter.
Figure 8:
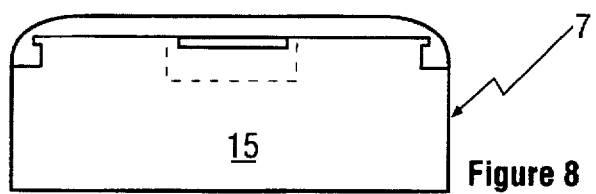
FIG. 8 is a bottom plan view of the elongated embodiment of the adapter.

FIG. 1 is a perspective view of a preferred embodiment of an adapter 1 coupled to a spare cell-telephone battery 3 having electrical connections 5. Adapter 1 has a top end 9, a right side 11, a left side 13 and a bottom end 15. In the center of top end 9, adapter 1 employs a cavity 19 which acts as the receiver of a hook 25 of a cradle/charging-unit 33.

FIGS. 2, 3, 4, and 5 illustrate, respectively, top, front, bottom and side views of adapter 1. Adapter's top 9, bottom 15, left side 13 and right side 11 are joined at their respective marginal edges to form its body. Top 9 and generally adapter 1 are shaped and formed to emulate the shape and form of cell-telephone 23. It is foreseeable that a number of varying designs are or will be employed. Adapter 1 further includes the cavities, channels and guides (described in detail below) of cell-telephone 23 which allow the adapter 1 to attach to a spare cell-telephone battery 3. It is understood throughout this disclosure that the physical shape of the cell-telephone 23 is not relevant and that adapter 1 can be shaped to emulate any cell-telephone for the purpose of emulating a cell-telephone and retaining a spare battery 3 in a cradle/charging-unit such as cradle/charging-unit 33.

Because a number of cradle/charging-unit designs exist, they each vary unsubstantially from each other. One significant difference between the earlier and current cradle/charging-units is that the earlier cradle/charging-units required that the cell-telephone's bottom end 37 abut the cradle/charging-unit's bottom end 39 and act as a retaining stop. This provided for the clip 25 and bottom 39 to hold the cell-telephone 23 about its respective top and bottom ends. This mandates an alternate embodiment of adapter 1, adapter 7, which employs an elongated body. FIGS. 6, 7, 8, and 9 illustrate, respectively, top, front, bottom and side views of adapter 7. Adapter 7 has top 9, bottom 15, left side 13 and right side 11 which are joined at their respective marginal edges to form a body. Top 3 and the body of adapter 7, as in adapter 1, are shaped and formed to emulate the shape and form of a cell-telephone 23. Adapters 7 and 1 further include the cavities, channels and guides of cell-telephone 23 which allow them to attach to the spare cell-telephone battery 3. Bottom 15 of adapter 7 serves as a stop against cradle/charging-unit's 33 bottom 39 emulating cell-telephone's 23 bottom 37. Bottom 15 and bottom 39 abut to contain and retain adapter 7 and its battery 3 in cradle/charging-unit 33. It is understood throughout this disclosure that the physical shape of the cell-telephone 23 is not relevant and that adapter 7 can be shaped to emulate any cell-telephone for the purpose of emulating a cell-telephone and retaining a spare battery 3 in a cradle/charging-unit 33.

Herein and hereafter, it shall be understood that adapters 1 and 7 serve the same purpose and function. Reference, function and application to one of the adapters 1 or 7 shall be construed as an equivalent reference to the other adapter 1 or 7.

Figures 10, 11, 12:
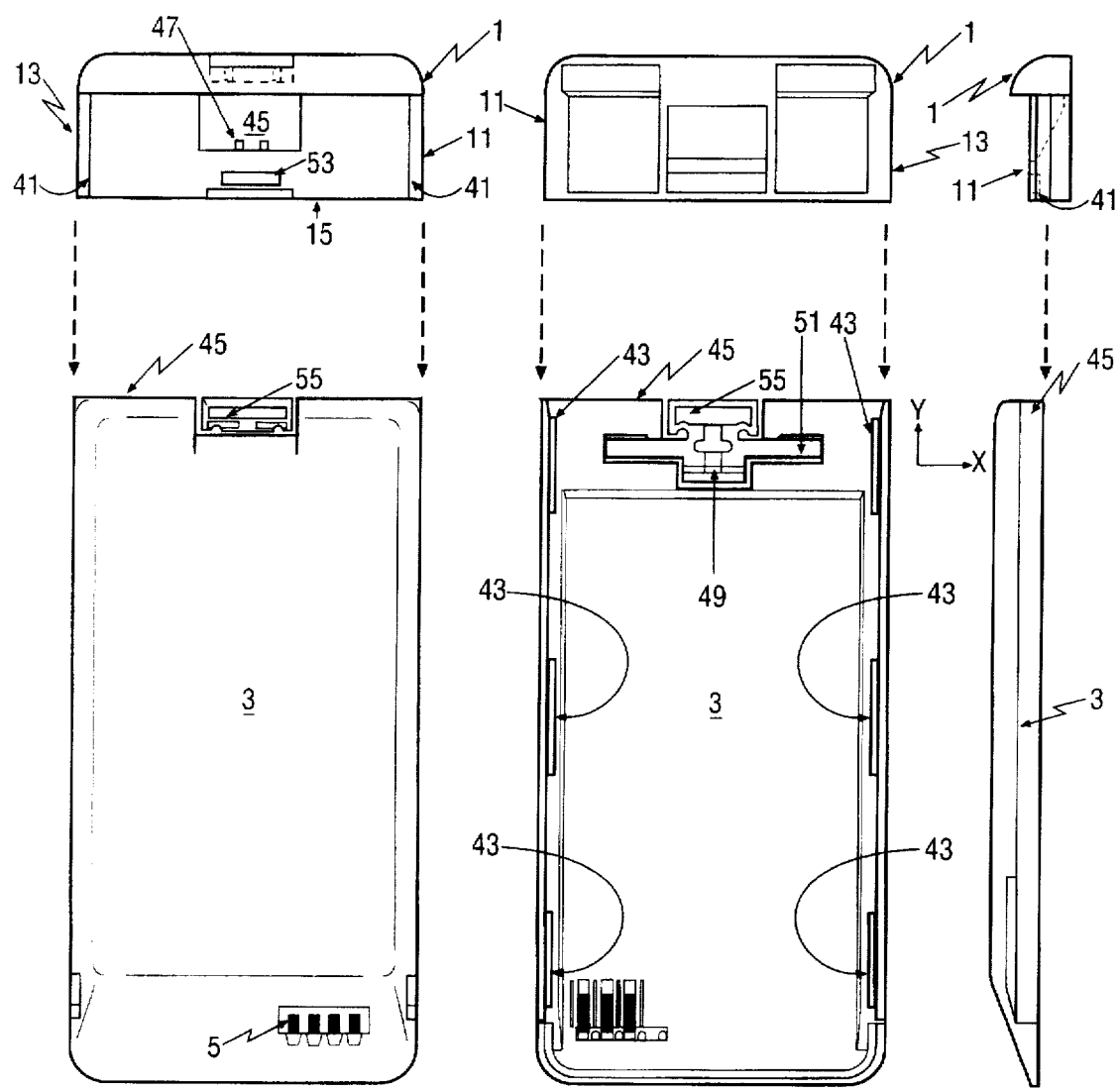
FIG. 10 is a front plan view of the preferred embodiment of the adapter in its spatial and engagement relationship with the spare cell-telephone battery.
FIG. 11 is a back plan view of the preferred embodiment of the adapter in its spatial and engagement relationship with the spare cell-telephone battery.
FIG. 12 is a side plan view of the preferred embodiment of the adapter in its spatial and engagement relationship with the spare cell-telephone battery.

Adapter 1 further emulates the retaining means of cell-telephone 23 to retain battery 3 therewith. FIGS. 10, 11 and 12 illustrate how adapter 1 and battery 3 engage. The cell-telephone 23 and corresponding adapter 1 have corresponding, matching channels 41 along its right side 11 and its left side 13. Channels 41 correspond to guides 43 of battery 3 and guides 43 are complimentary positioned and dimensioned to reciprocate and/or slide along channels 41 until top 9 of adapter 1 abuts top 45 of battery 3.

Adapter 1 and battery 3 employ reciprocal, complimentary means for locking engagement. In the preferred embodiment adapter 1 adopts the mating and/or interlock capability of cell-telephone 23 which allows the cell-telephone 23 and battery 3 to mutually and removably engage and disengage. In the preferred embodiment, adapter 1 has a cavity 45 and two pressure studs 47. As illustrated in FIGS. 10 and 11, top 9 of adapter 1 approaches top 45 of battery 3 by mutual engagement and cooperation between corresponding channels 41 and guides 43 of adapter 1 and battery 3. To selectively retain adapter 1 and battery 3 together, the adapter 1 of preferred embodiment employs the means of keeping the battery 3 with cell-telephone 23. Namely, anchor 49, which is suspended on a torsion bar 51, having rotational, pivotal motion about its two secured, opposite ends and respectively secured to the body of battery 3, snap fits into adapter's 1 cavity 53. Because bar 51 has a biased, rotational, pivotal motion, it snap fits anchor 49 into cavity 53 where it remains until such time as it is pushed out of the cavity and the battery is removed either from the adapter 1 or cell-telephone 23. Further observation of the lock/unlock mechanism may be observed by a study of a Motorolla brand cell-telephone and its associated batteries.

To remove battery 3 from the cell-telephone 23 or adapter 1, user applies pressure to button 55 toward cell-telephone 23 or adapter 1. This applies leverage against pressure-studs/mail-anchor-points 47, rotates bar 51 about its x-axis and sufficiently removes anchor 49 from cavity 53 so that a force applied to battery 3 in the downward, negative y-axis direction, will now allow battery 3 to disengage and separate from cell-telephone 23 or adapter 1 along their respective channels 41 and guides 43.

Figure 13:
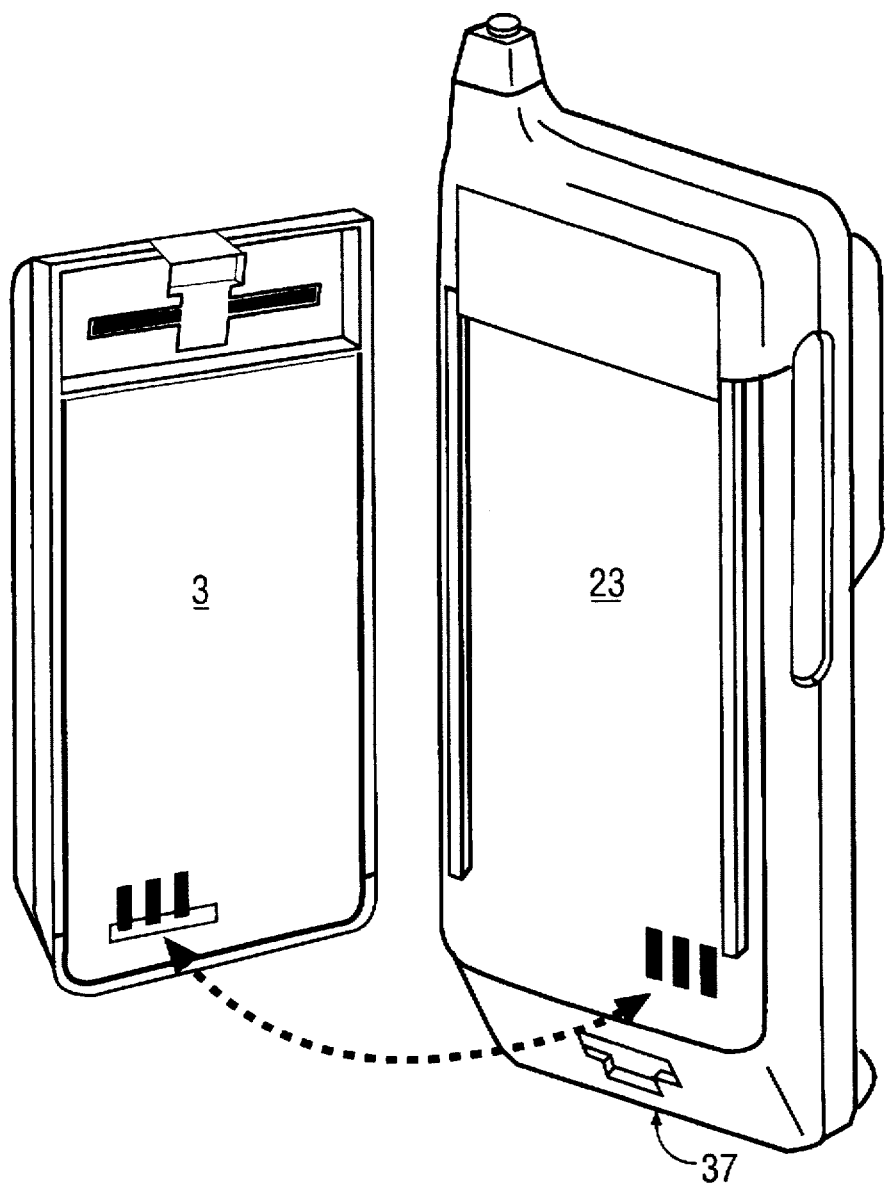
FIG. 13 illustrates the electrical connectors of the battery and the cell-telephone.
Figures 14, 14A:
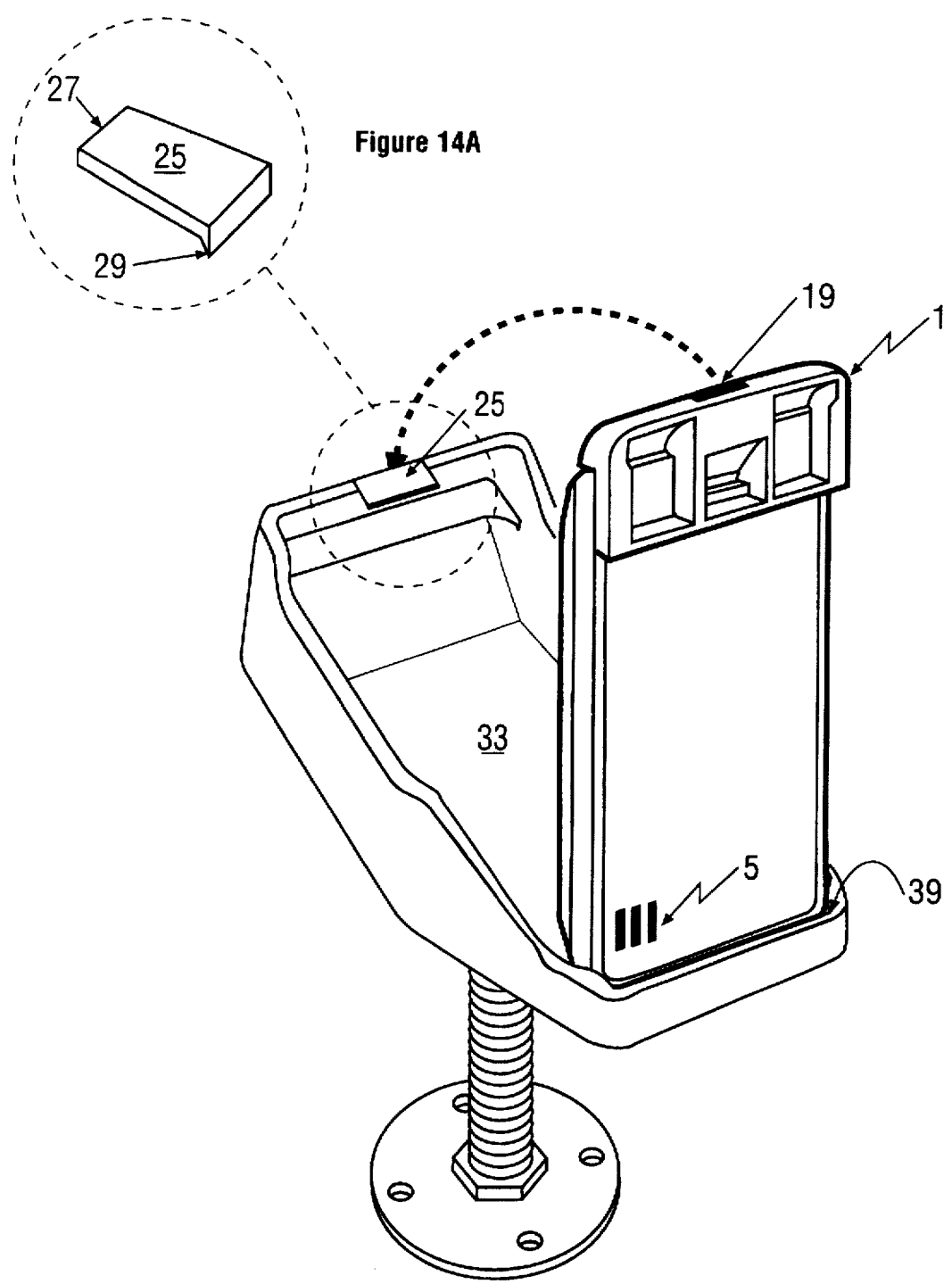
FIG. 14 illustrates the spatial relationship of the adapter engaged to the spare battery and the cradle/charging-unit retaining the battery; and, FIG. 15 illustrates the abutting electrical connections of the battery and the charging unit.

As explained above, adapter 1 is provided to allow battery 3 to charge from the cradle/charging-unit 33 while it is not attached to a cell-telephone 23. Each battery 23, therefore, has electrical terminals/connections 5 which are used to supply electrical energy to cell-telephone 23, as shown in FIG. 13, or are used to draw electrical power from cradle/charging-unit 33 while charging. Cradle/charging-unit 33 has respective electrical terminals/connections 35 which are connected to the automobile's power supply and have a positive and a negative terminal. Electrical terminals/connections 35 are positioned on cradle/charging-unit 33 to make connection with battery 3 electrical terminals/connections 5, as shown in FIGS. 15 and 14. More particularly, FIG. 15 illustrates adapter 1 and battery 3 in cradle/charging-unit 33 with their respective electrical terminals/connections 5 and 35 aligned such that they are touching and have a substantially continuous electrical contact, allowing battery 3 to charge and to draw power from terminals 35 which are connected to the vehicle's power supply such as its battery and/or electrical generation system.

FIG. 14 further illustrates how adapter 1, battery 3 and cradle/charging-unit 33 are arranged to retain battery 3 and adapter 1 securely in the cradle/charging-unit 33. In the normal or severe operating conditions involving a vehicle, which may utilize paved and/or unpaved highways, there are many abrupt and relatively stressful motions which would likely displace an unsecured battery 3 from its charging position in cradle/charging-unit 33 unless it is secured in place.

As described above, currently battery 3 is designed to charge in the cradle/charging-unit 33 piggy-backed or attached to cell-telephone 23. Cell-telephone 23 is retained by a clip 25 which has an anchored, biased pivot end 27 and a hook end 29. Further, pivot end 27 has limited, rotational movement ability in respect to cradle/charging-unit 33. In other embodiments, clip 25 having pivot end 27 may rotate about its juncture point with cradle/charging-unit 33 with the assistance of or suspended on a coiled spring, torsion bar or torsion spring (not shown). The pivot end 27 is usually placed about the top end of cradle/charging-unit 33, although it could be placed just about anywhere along cradle/charging-unit 33. The pivot end 27 is capable of deflection about its pivot end to allow its opposite hook end 29 to move about the pivot point of pivot end 27 which is fixed to cradle/charging-unit 33. The hook end 29, urged by top end of cell-telephone 23 or top end 9 of adapter 1, deflects hook end 29 along the contours of top end 9 or top end of cell-telephone 23 when the cell-telephone 23 or top end of adapter 1 and attached battery 3 are urged into charging position in cradle/charging-unit 33 as shown in FIG. 14. The hook end 29 is deflected about its pivot end 27 until hook end 29 meets and snap fits into corresponding and positioned cavity 19 in the top end of cell-telephone 23 or top end 9 of adapter 1. Cavity 19 is positioned complimentary to the position of clip 25 and its hook end 29 to receive hook end 29. When hook end 29 is inside the cavity 19, the adapter 1 or cell-telephone 23 attached to battery 3, are secured in cradle/charging-unit 33 and are capable of maintaining their position therein therefore they are capable of maintaining the electrical connection between contacts/terminals 5 and 35, thereby allowing the battery 3 to charge.

One way to detach cell-telephone 23 or adapter 1 and battery 3 from cradle/charging-unit 33 is by applying downward force on clip 25 along its pivot end 27. This force causes hook end 29 to leave cavity 19 and allows the user to remove the battery 3 and adapter 1 or cell-telephone 23 from the cradle/charging-unit 33. Another way to detach cell-telephone 23 or adapter 1 and battery 3 from cradle/charging-unit 33 is to remove bottom portion of battery 3 from the cradle/charging-unit 33 and thereby defeat the hook retainment of hook end 29 and cavity 19.

As discussed above, in some applications adapter 7 is used to provide a stop for abutting bottom end 39 of cradle/charging-unit 33. In other applications clip 25 and corresponding cavity 19 are sufficient to contain the battery 3 or cell-telephone 23 in cradle/charging-unit 33.

While the invention has been described by reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve the same results are within the scope of this invention.

I claim:

1. A battery adapter for charging a spare cellular telephone battery in a vehicle charging unit, the adapter comprising:
   a) a charging unit, having:
      (i) first power supply connections therein, positioned for electrical coupling with corresponding second connections of a battery for use with a cellular telephone; and
      (ii) a clip having an anchored biased pivot end and a hook end, wherein said hook end is resiliently movable about said pivot end for urging said hook end into a corresponding cavity of said cellular telephone for retainment of said cellular telephone in said charging unit and for urging said first and second power supply connections together to maintain electrical coupling thereof;
   b) an adapter adapted to engage with said battery, for charging said battery while said cellular telephone is outside said charging unit, said adapter having a cavity therein positioned for receipt of said hook end of said clip for retaining said adapter and said battery in said charging unit and to provide electrical contact between said first and second power supply connections.

2. The clip of claim 1 wherein said pivot end is coupled to a spring for biasing said hook end toward said adapter cavity.

3. The clip of claim 1 wherein said clip is resilient and movable about its pivot axis to provide movement of said hook end about said pivot end.

4. The clip of claim 1 wherein said movable pivot end is connected to said charging unit by a torsion bar.

5. The adapter of claim 1 further including a recess for snap fit engagement and disengagement with a correspondingly positioned movable anchor of said battery.

6. The device of claim 1 further including engagement/disengagement means for connecting and disconnecting said battery and said cellular telephone.

7. The device of claim 1 wherein said engagement/disengagement means are compatible for engagement/disengagement of said adapter and said battery.

8. The adapter of claim 1 further including at least one channel therein for slidable engagement and disengagement with at least one guide attached to said battery.

9. The device of claim 1 wherein said adapter is shaped corresponding to the dimension of said cellular telephone for secure retainment of said battery and said adapter in said charging unit.

10. The device of claim 1 wherein said adapter has mutually opposed parallel ends, said first end having said cavity therein and said second end dimensioned corresponding to lower end of said cellular telephone for abutting lower end of said charging unit and for retaining said adapter and said spare battery in said charging unit.

11. A battery adapter for charging a spare cellular telephone battery in a vehicle charging unit, the adapter comprising:
   a) a charging unit, having:
      (i) first power supply connections therein, positioned for electrical coupling with corresponding second connections of a battery for use with a cellular telephone; and
      (ii) a resilient clip having an anchored biased pivot end and a hook end, wherein said hook end is resiliently movable about said pivot end for urging said hook end into a corresponding cavity of said cellular telephone for retainment of said cellular telephone in said charging unit and for urging said first and second power supply connections together to maintain electrical coupling therein;
   b) an adapter having a recess therein positioned for snap fit engagement and disengagement with a correspondingly positioned movable anchor of said battery, said adapter and said battery together positioned to charge said spare battery in said charging unit while said cellular telephone is outside said charging unit, said adapter further having a cavity therein positioned for receipt of said hook end of said clip to retain said adapter and said battery in said charging unit and for providing electrical contact between said first and second power supply connections.

12. The device of claim 11 wherein said adapter unit has a pair of mutually opposed parallel ends, said first end having said cavity therein and said second end dimensioned corresponding to lower end of said cellular telephone for abutting lower end of said charging unit to retain said adapter and said spare battery in said charging unit.

13. The adapter of claim 11 further including at least one complimentary channel for engagement with at least one corresponding channel guide of said battery.

14. The device of claim 11 wherein said adapter is shaped like said cellular telephone for secure retainment of said battery and said adapter in said charging unit.

15. The clip of claim 11 wherein said pivot end is coupled to a spring for biasing said hook end toward said adapter cavity.

16. The clip of claim 11 wherein said clip is resilient and movable about its pivot axis to provide movement of said hook end about said pivot end.

17. The clip of claim 11 wherein said movable pivot end is connected to said charging unit by a torsion bar.

18. The device of claim 11 further including engagement/disengagement means for connecting and disconnecting said battery and said cellular telephone.

19. The device of claim 18 wherein said engagement/disengagement means are compatible for engagement/disengagement of said adapter and said battery.

20. The adapter of claim 19 further including at least one channel therein for slidable engagement and disengagement with at least one guide attached to said battery.

21. The device of claim 11 wherein said adapter is shaped corresponding to the dimension of said cellular telephone for secure retainment of said battery and said adapter in said charging unit.

22. The adapter of claim 11 further including opposed ends, said first end having said cavity therein and said second end dimensioned corresponding to lower end of said cellular telephone for abutting lower end of said charging unit and for retaining said adapter and said spare battery in said charging unit.

* * * * *